Jan. 22, 1946.  W. W. EITEL ET AL  2,393,459
ELECTRODE
Filed Oct. 2, 1942
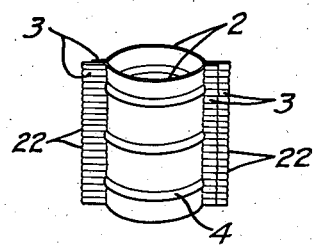
INVENTORS
WILLIAM W. EITEL
JACK A. McCULLOUGH
BY Harold E. Sorg
THEIR ATTORNEY Patented Jan. 22, 1946

2,393,459

UNITED STATES PATENT OFFICE 2,393,459

ELECTRODE

William W. Eitel, San Bruno, and Jack A. McCullough, Millbrae, Calif., assignors to Eitel-McCullough, Inc., San Bruno, Calif., a corporation of California Application October 2, 1942, Serial No. 460,724

1 Claim. (Cl. 250—27.5)

Our invention relates to the manufacture of electrodes for electronic tubes.

It is among the objects of our invention to provide an improved plate electrode of the tubular type.

The invention possesses other objects and features of advantage, some of which, with the foregoing, will be set forth in the following description of our invention. It is to be understood that we do not limit ourselves to this disclosure of species of our invention as we may adopt variant embodiments thereof within the scope of the claim.

Referring to the drawing:

The single figure is a perspective view of a flanged type of electrode embodying the improvements of our invention.

In terms of broad inclusion, one type of electrode embodying our invention comprises a tubular body having radially flanged arcuate sections, which sections have radially extending corrugations therein. The sections are joined by welding the flanges together, after which the flanges are corrugated. Corrugating the flanges serves to straighten them after welding. When molybdenum parts are welded together a piece of platinum is interposed between the parts at the weld.

In greater detail, and referring to the drawing, the figure illustrates a flanged or finned type of tubular plate electrode adapted for use in an electronic tube along with other electrodes such as a grid and cathode. Our improved electrode comprises arcuate sections 2 welded together along overlapping flanges 3 integral with the sections. Two semi-circular sections are shown, providing a pair of oppositely disposed heat radiating fins, but it is understood that more sections may be employed to increase the number of fins. The sections preferably extend lengthwise of the electrode with the outturned radial flanges forming longitudinally extending fins. One of the overlapping flanges is preferably wider than the other to increase the overall width and consequently the heat radiating area of the composite fin.

The sections are formed in a suitable die, and, in order to prevent them from springing open after being stamped, they are preferably formed with circumferentially disposed integral ribs or beads 4. Two or more of these reinforcing ribs are provided, spaced axially along the electrode. Any suitable material, such as tantalum, may be used for making up the sections of the electrode. After assembling the sections of the anode the overlapping flanges are welded together to form integral fins.

In welding the flanges of an electrode together it is found that the welding operation tends to distort the fins, causing them to bow out from a true plane. This bowing sets up undesired stresses in the structure and detracts from the appearance of the unit. To overcome this we form transverse corrugations 22 in the flanges, which corrugations extend radially with the fins as shown in the figure. These corrugations relieve the stresses set up during welding, and cause the fins to resume their true planar positions. The corrugated fins also radiate heat more efficiently than do those with smooth surfaces.

We claim:

An electrode having a tubular body comprising flanged arcuate sections secured together along said flanges, a flange on one of the sections having a portion projecting beyond the edge of an adjacent flange of another section, said projecting portion lying in a plane parallel with said adjacent flange.

WILLIAM W. EITEL.
JACK A. McCULLOUGH.